May 13, 1958 C. J. CHAPLIN 2,834,661
SELF-KINDLING FUEL PACKAGE
Filed Oct. 11, 1956 3 Sheets-Sheet 1

May 13, 1958     C. J. CHAPLIN     2,834,661
SELF-KINDLING FUEL PACKAGE

Filed Oct. 11, 1956     3 Sheets-Sheet 2

May 13, 1958 C. J. CHAPLIN 2,834,661
SELF-KINDLING FUEL PACKAGE
Filed Oct. 11, 1956 3 Sheets—Sheet 3

United States Patent Office 2,834,661
Patented May 13, 1958

2,834,661

SELF-KINDLING FUEL PACKAGE

Charles J. Chaplin, South Portland, Maine, assignor to Chaplin Corporation, Portland, Maine, a corporation of Maine Application October 11, 1956, Serial No. 615,398

8 Claims. (Cl. 44—40)

This application is a continuation-in-part of my copending application of November 25, 1955, Serial No. 548,854, now abandoned, relating to a novel self-kindling fuel package especially adapted to contain charcoal briquettes and the like.

As is well known, the use of charcoal briquettes and similar fuels especially for cooking has become widespread and is increasing rapidly. The broiling of steaks or hamburger, or the like on an outdoor grill is an example of this. Accordingly, such fuel has been put on sale in grocery stores and similar retail establishments so that it may be conveniently purchased at the same time as food is purchased. However, the classic packaging of such fuel in relatively large paper bags has proved to be troublesome for a variety of reasons: more specifically, the transfer of charcoal briquettes from paper bag to grill is a messy and dirty operation; and the fuel is difficult to kindle. Hence, people are frequently deterred from building a charcoal fire not only because of the inconvenience of handling large paper bags of briquettes, but also because of the necessity of obtaining some kind of kindling material which will light easily, forming a charcoal bed on or above this material, and tinkering with the fire for a time after it is lit to make sure that the charcoal or other fuel is burning properly. At best, the process is not only a time consuming one, but particularly where charcoal briquettes are used, is also rather messy.

Accordingly, it is one object of the present invention to provide a novel container for packaging charcoal briquettes or the like which will obviate the necessity of the user coming in contact with the briquettes in any way, and which is so designed and constructed with a novel central chimney section that it can be readily ignited from the outside to effect a thorough and complete ignition of the fuel, entirely without the use of any extraneous kindling material whatsoever to provide the most desirable type of charcoal bed for broiling and the like.

Another object of the invention is to provide a container for charcoal briquettes or the like which is sufficiently rigid to support the briquettes contained therein no matter how it is held or otherwise transported, and yet is itself capable of being readily ignited to kindle the briquettes from the center of the bed outwardly, as is most desirable, and thereafter be entirely consumed so that the taste of the food to be cooked will not be affected in any manner by the presence of the burning container.

It is another object to provide a container of the above-mentioned character having a depending edge portion on the base thereof serving as a fuse to facilitate ignition.

A further object of the invention is to provide a fuel container which when separate from its cover portion will nest for shipment from the point of its manufacture of the molded product to the point where, by filling it with charcoal and assembling it with its cover portion, there is afforded a completed fuel package available for sale in grocery stores and similar retail establishments.

The novel features of the invention, together with further objects and advantages thereof, will become more readily apparent from the following description of preferred embodiments of the invention when taken with the accompanying drawings, wherein.

Figure 1:
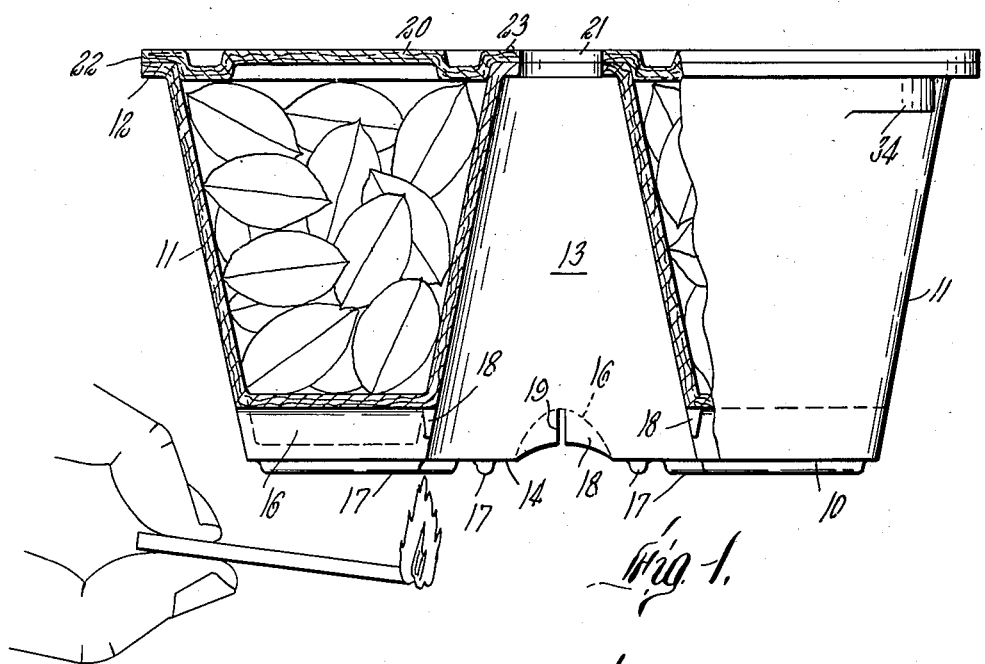
Fig. 1 is a partial sectional elevational view of a preferred fuel container according to the invention showing a method of ignition thereof.
Figure 2:
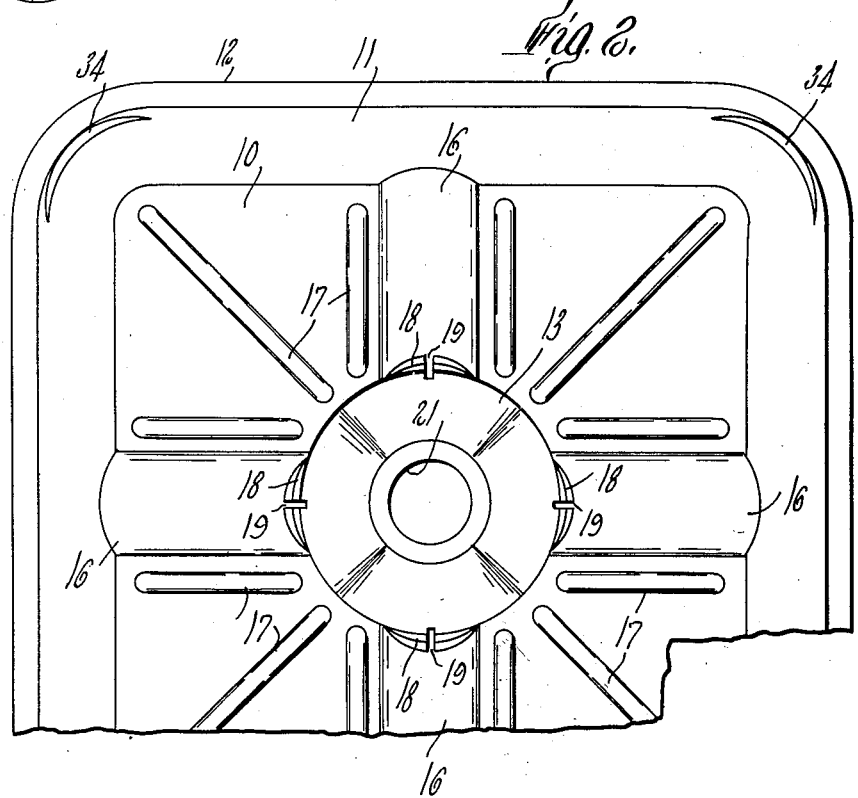
Fig. 2 is a bottom view, partially broken away, of the fuel container of Fig. 1.

With reference first to Figs. 1 and 2, it will be observed that the preferred fuel package according to my invention comprises in essence a generally square container portion with a central chimney and fuse portion adjacent thereto to facilitate ignition, together with a cover portion therefor which together afford a readily ignitible, dust-tight package especially useful both for containing and kindling a fuel such as charcoal briquettes or the like. The container portion in general has a base wall 10, upstanding and preferably outwardly flaring side walls 11 with an upper horizontal, outwardly extending flange 12, and a generally central chimney section 13 which projects upwardly through the base wall 10 of the crate. Preferably, lugs 34 are provided near the top of the container portion at the corners of the side walls thereof to facilitate nesting of the container portions separately from the covers.

Figure 5:
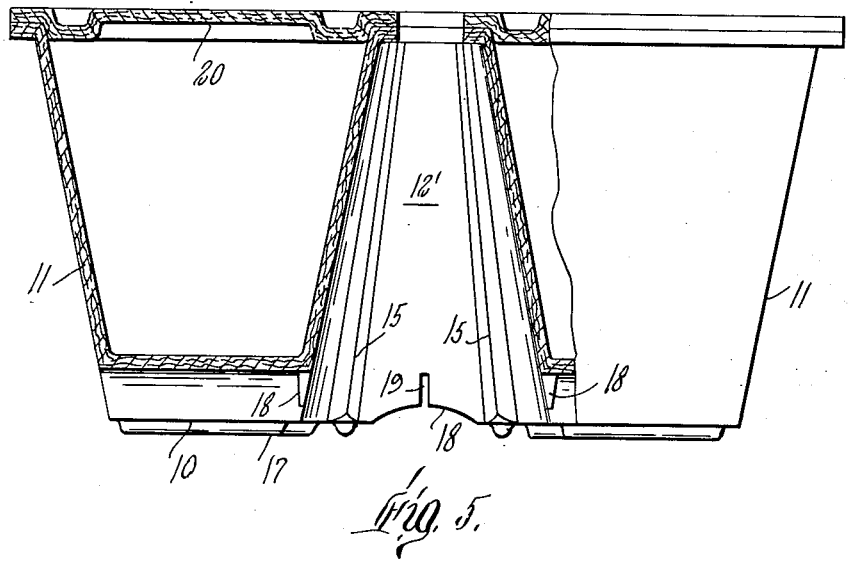
Fig. 5 is a sectional view showing a modified structure of my novel container wherein the interior of the central chimney section is ribbed to provide additional ignition.
Figure 6:
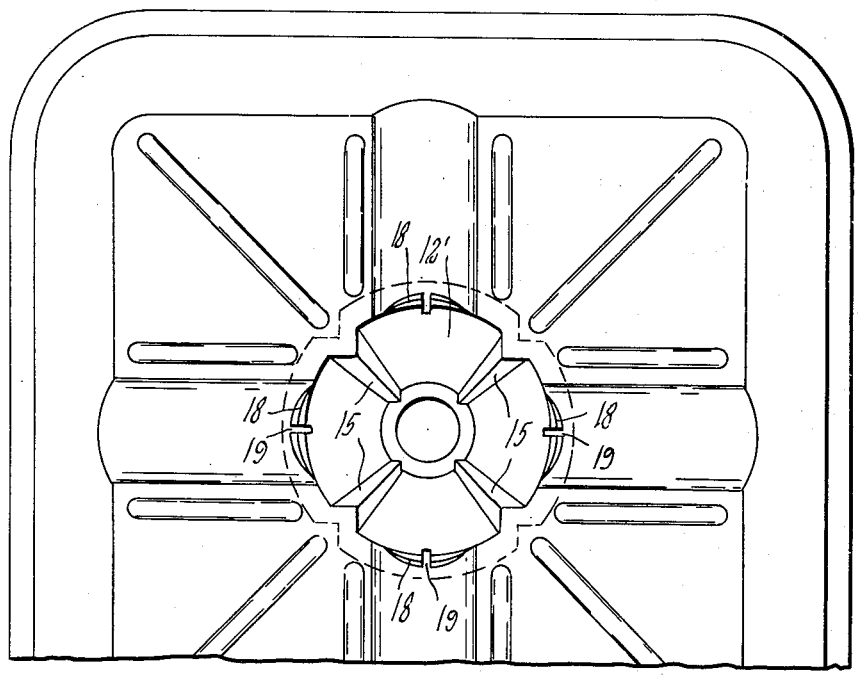
Fig. 6 is a bottom view of the modified structure of Fig. 5.

Chimney section 13 is frusto-conical in shape, although other shapes could be used, and defines at its lower end an aperture 14 in the base wall 10. If more rapid ignition of the briquettes be desired, a somewhat modified chimney section may be provided as shown in Figs. 5 and 6 wherein a chimney section 12' is provided with a series of indented portions which appear as vertical ribs 15 extending along the inside of the chimney portion, the lower edges of which are easily ignited to start the chimney burning. With such ribs, there is likewise achieved somewhat more rapid ignition of the fuel immediately adjacent to the central area because of the increased surface area in contact with the fuel.

As best seen in Fig. 2, there are preferably formed in the exterior surface of the base wall 10 four indentations or air passages 16 which extend from the respective outer edges of the base wall inwardly to aperture 14 adjacent the wall of the chimney 12. Also, if desired, ribs 17 may also be provided on the bottom of base wall 10. These air passages 16 and to a lesser extent the passages between ribs 17 connect the interior of the chimney at the bottom with the space outside of the container itself, and enable the more ready combustion of the bottom of the container by furnishing a better supply of air to it, particularly when the container is set on a grill which has a minimum of openings through it. This also provides added circulation up through the chimney, enabling the chimney to have better draft, since the shape of the chimney and its height causes a draft or drawing the fire from the bottom through the top. Ribs 17 also serve not only to stiffen and reinforce the bottom of the container, but also to provide a space between the bottom of the container and its support when it is being consumed, and further enable the fire to spread out over the bottom of the container and ignite the fuel bed on its under side.

To facilitate ignition of the base portion as by a match (Fig. 1) thin projecting sections 18 are preferably provided within air passages 16 adjacent the bottom of the chimney. These sections 18 or projecting edge portions of the bottom of the container taper toward the bottom and terminate in a relatively thin, sharp edge which may further be provided with notches 19 if desired.

Figure 7:
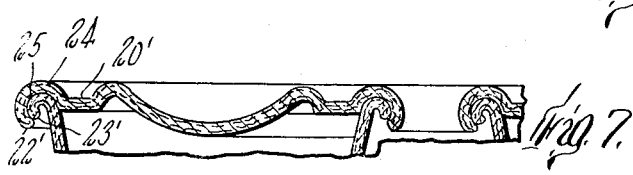
Fig. 7 is a partial sectional view showing another modified structure of my novel container, particularly the cover portion thereof.

The cover portion of the package is preferably a generally flat sheet 20 having a central aperture 21 above the top of the chimney section 13 to provide a complete through passage from the bottom of the container to the top. In other words, aperture 21 is vertically aligned with the aperture in the base at the top of the chimney, and preferably is of about the same diameter as the upper end of the chimney section. It may have an outer groove providing an outer peripheral flange 22 which rests on the flange portion 12 of the container portion and also a similar inner groove adjacent the aperture 21 providing an inner flange 23. Also, the sheet portion between the inner and outer peripheral grooves may be arranged resiliently as by bending it inwardly as shown in Fig. 7 to press upon the briquettes within the package so that they are better held in position to avoid breakage.

Any suitable means may be employed for joining the cover to the crate if such joinder is desired. For example, an adhesive substance may be provided between the respective container and cover flanges and also between the upper extremity of the chimney section and the portion of the cover which overlies it. It is by no means a requirement that the cover be permanently attached, however, particularly if the modification of Fig. 7 be employed since the grooves 20' in the cover together with the downturned edges 24 and 25 at the outer extremities of the flanges 22' and 23' prevent it from being displaced laterally once it is seated on the container portion.

Because the charcoal briquettes, which substantially fill the enclosure provided by the container and the cover are fairly heavy, it is essential that the container be formed of material which is relatively rigid, for otherwise it will be incapable of supporting the weight of the briquettes especially when it is being carried by the user. To meet this need for rigidity, and at the same time provide an assembly which is readily combustible such that it is of itself capable of kindling the briquettes, it is preferred that the container be molded of a readily combustible fibrous material. The cover may likewise be molded from this type of material. Thus the entire assembly is preferably made from a material such as, for example, molded pulp, which is completely combustible, readily ignitable and which contains a minimum of non-combustible materials or materials such as ink, resin, glue or fillers which may cause it to burn slowly and continue to smoke for a period of time, even though the container itself has been completely consumed. It should be understood, nevertheless, that the invention is in no way limited to this type of material and that the cover particularly may optionally be made up of flat sheet material such as paper or cardboard. Such material does not lend itself so easily to the form of container disclosed herein, however, because of the fabrication problems involved, and further, it is not so well suited as is molded pulp for the combustion and kindling of the briquettes.

Figure 3:
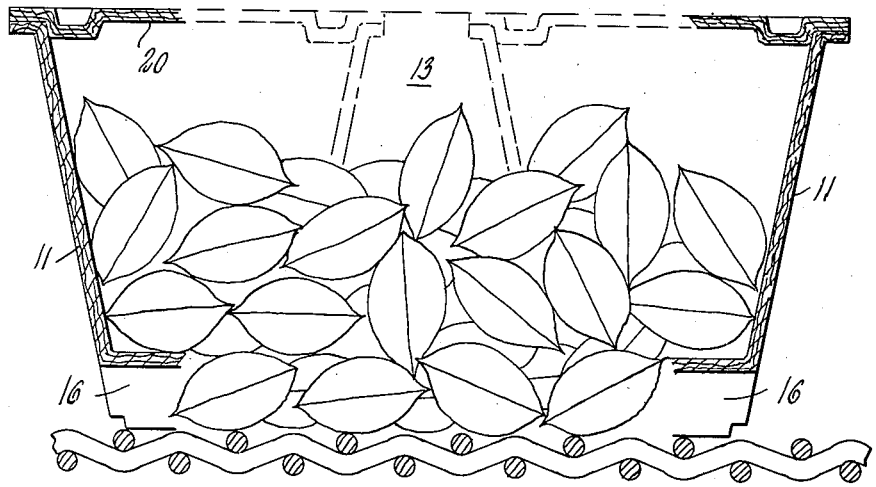
Fig. 3 is a sectional view like that of Fig. 1 showing the condition of the container after the inside central section, as shown by phantom lines, has been ignited and partially burned away.
Figure 4:
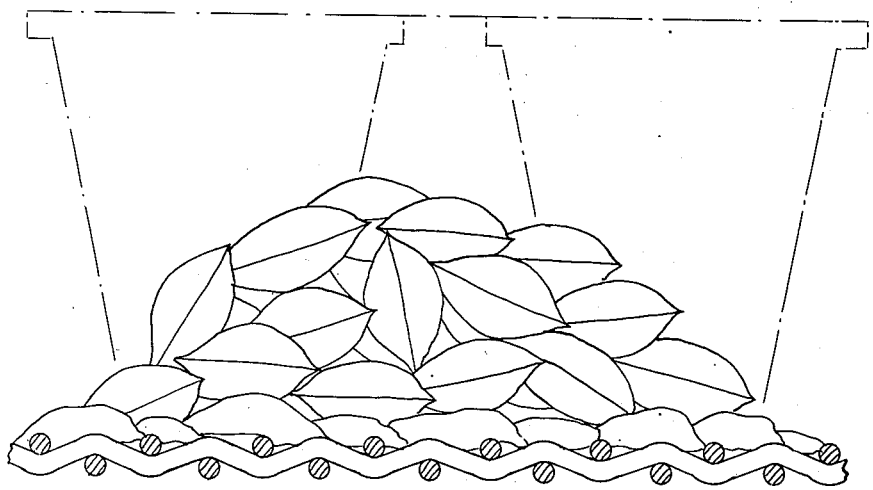
Fig. 4 is a sectional view like that of Fig. 3 showing the condition of the charcoal bed after the container is completely consumed, the container itself being shown in phantom lines as before it was ignited.

In use, the package is ignited by applying a match, lighter, or other means to the sections 18 which are especially well adapted to serve as a fuse. Optionally, such ignition may be carried out either before or after the package has been set in place on a grill, for example, since the indentations in the base wall define an air passage or tunnel leading to the edges into which a match may be inserted. Once the edges 18 have been ignited, combustion of the chimney will take place rapidly due to the draft of air up through the chimney and out the hole in the cover. Consequently, the chimney section itself will be the first to burn away and during its combustion, the center of the fuel bed is ignited, the fuel towards the outside being maintained in close contact with the hot central area by the sides of the crate (Fig. 3). In other words, the spread of ignition throughout the bed takes place from the core of the bed outwardly before the container shell has burned away. Thereafter the container is entirely consumed, leaving the fuel in a neat and compact pile ready for cooking (Fig. 4).

To make the package even more easily ignitable under extreme conditions of wind or cold, paper or other readily ignitable material may be inserted inside the chimney section before it is lighted. Then, too, the match or other lighting means may be held inside the chimney where it is shielded from the wind. If desired, wax can also be applied to the inside of the chimney section to aid in getting the chimney started and in kindling the briquettes.

Thus it is seen that I have provided, for a fuel which would otherwise be dusty and dirty to handle, a neat, attractive and dust-tight fuel package of a self-kindling nature because of its novel fuse means thereon.

Various modifications of my novel package within the spirit of the invention and the scope of the appended claims will be apparent to those skilled in the art.

I claim:

1. A substantially dust-tight self-kindling fuel package comprising a readily combustible container having loose discrete pieces of fuel therein, said container including spaced outer and inner wall means joined at their ends around their peripheries providing a substantially dust-tight seal, said inner wall means forming a chimney within said outer wall means with said fuel positioned around said chimney between said outer and inner wall means.

2. A package as set forth in claim 1 wherein a marginal portion of said container has an indentation, said indentation extending from exteriorly of said container and communicating with said chimney at its lower end providing an air passage communicating to said chimney to provide a substantial draft therethrough.

3. A package as set forth in claim 2 further including fuse means at the juncture of said chimney and said indentation.

4. A substantially dust-tight self-kindling fuel package comprising a readily combustible container having loose discrete pieces of fuel therein and a readily combustible cover for said container affixed to the upper ends of the walls thereof around the periphery thereof providing a substantially dust-tight seal, said container including outer walls and inner walls joined at their lower ends forming a base and extending upwardly from said base, said inner walls forming a chimney within said outer walls, said chimney extending upwardly from said base with said fuel positioned around said chimney between said outer and inner walls, said cover having a hole therethrough communicating with said chimney to provide a substantial draft therethrough.

5. A package as set forth in claim 4 wherein said container is formed of molded pulp and said fuel is charcoal.

6. A package as set forth in claim 4 further characterized in that said chimney is provided with a plurality of vertically extending ribs.

7. A package as set forth in claim 4 wherein said cover is provided with peripheral grooves adjacent its inner and outer peripheries cooperating with the upper portions of said walls to prevent lateral displacement of said cover on said container.

8. A package as set forth in claim 7 wherein the portion between said grooves is inwardly bent to resiliently press on said pieces of fuel.

References Cited in the file of this patent

UNITED STATES PATENTS

| | | |
|---|---|---|
| 282,868 | Eddy | Aug. 7, 1883 |
| 1,959,473 | Heron | May 22, 1934 |
| 2,165,390 | Lamkin | July 11, 1939 |

FOREIGN PATENTS

| | | |
|---|---|---|
| 438,292 | France | May 13, 1912 |